US009407797B1

(12) United States Patent
Newell et al.

(10) Patent No.: US 9,407,797 B1
(45) Date of Patent: Aug. 2, 2016

(54) METHODS AND SYSTEMS FOR CHANGING DUTY CYCLE TO REDUCE JUDDER EFFECT (71) Applicant: VALVE CORPORATION, Bellevue, WA (US)

(72) Inventors: Dan Newell, Bellevue, WA (US); Benjamin David Krasnow, Redwood City, WA (US)

(73) Assignee: VALVE CORPORATION, Bellevue, WA (US)

( * ) Notice: Subject to any disclaimer, the term of this patent is extended or adjusted under 35 U.S.C. 154(b) by 143 days.

(21) Appl. No.: 13/865,144

(22) Filed: Apr. 17, 2013

(51) Int. Cl.
*H04N 5/228* (2006.01)
*H04N 5/225* (2006.01)
*G06F 3/038* (2013.01)
*G09G 5/00* (2006.01)

(52) U.S. Cl.
CPC ...................... *H04N 5/225* (2013.01)

(58) Field of Classification Search
CPC .......... H04N 5/23248; H04N 5/23251; H04N 5/23254; H04N 5/23258; H04N 5/144; H04N 5/145
USPC ............... 348/208.99, 208.1–208.4; 345/204, 345/211, 212
See application file for complete search history.

(56) References Cited

U.S. PATENT DOCUMENTS

| 7,317,445 | B2 * | 1/2008 | Hekstra | G09G 3/20 345/102 |
|---|---|---|---|---|
| 2004/0210385 | A1 | 10/2004 | Dale et al. | |
| 2006/0164528 | A1 | 7/2006 | Harrold et al. | |
| 2007/0035706 | A1 | 2/2007 | Margulis | |
| 2009/0141980 | A1 | 6/2009 | Elliott | |
| 2009/0237563 | A1 | 9/2009 | Doser | |
| 2010/0091139 | A1 | 4/2010 | Sako et al. | |
| 2010/0231800 | A1 | 9/2010 | White et al. | |
| 2011/0176043 | A1 | 7/2011 | Baker et al. | |
| 2011/0298936 | A1 * | 12/2011 | Watanabe et al. | 348/208.4 |
| 2012/0063681 | A1 | 3/2012 | Sandrew et al. | |
| 2012/0141045 | A1 | 6/2012 | Bae et al. | |
| 2012/0293607 | A1 | 11/2012 | Bhogal et al. | |
| 2012/0307086 | A1 * | 12/2012 | Jefremov et al. | 348/208.4 |
| 2014/0375679 | A1 * | 12/2014 | Margolis | G09G 3/3208 345/633 |

OTHER PUBLICATIONS

PCT International Search Report dated Aug. 20, 2014 of International Application No. PCT/US14/033414. 10 Pages.

* cited by examiner

*Primary Examiner* — Kelly L Jerabek
(74) *Attorney, Agent, or Firm* — Barceló, Harrison & Walker, LLP (57) ABSTRACT

Methods and systems relating to compensation for discrepancies in an image that may be captured with a moving camera or a moving head. The visual artifacts in the visual field may be reduced or eliminated by monitoring head and camera movements for a Heads Up Display (HUD) application, and feeding back the movement data to a compensation circuit to eliminate or reduce the visual artifacts such as judder effect, as the head and the camera move relative to the objects that the camera may be capturing. The duty cycle of one or more pixels and/or one or more groups of pixels of the display may be varied at different rates for different head and camera movement speeds. The faster the camera or head moves the shorter the duty cycle that may be applied to the display so that the image has low persistence.

22 Claims, 12 Drawing Sheets

METHODS AND SYSTEMS FOR CHANGING DUTY CYCLE TO REDUCE JUDDER EFFECT

BACKGROUND OF THE DISCLOSURE

1. Field of the Disclosure

The disclosure relates generally to methods and systems for using knowledge of the current or predicted head and camera movements of the user to dynamically adjust display parameters to avoid or to compensate for discrepancies of visual artifacts in the visual field. This may be completed on a fine grain basis, for instance on an intra-frame basis so as to eliminate or reduce discrepancies of visual artifacts in the visual field and reduce latency and, more specifically according to aspects of certain embodiments, to methods and systems for providing variable duty cycle capability to the display for use in combination with display images with heads-up displays for augmented reality applications so as to reduce the effects of head or camera movement.

2. General Background

Previous attempts have been made to solve the problem of a display containing discrepancies of visual artifacts in the visual field that may be caused by head and camera movements, for example by increasing the frame rate of the whole graphics system. This solution may overly tax resources when a more elegant, lower complexity, lower power and lower cost solution may use knowledge of the current or predicted head and camera movements of the user to modify a frame on an intra-frame basis.

There may be many types of visual artifacts in the visual field that may be caused by head and camera movements. A camera may take pictures of a room at a rate of 24 frames per second, 30 frames per second or even 60 frames per second. As the camera pans the room the camera takes snapshots of the room. If the camera moves fast enough, the difference in time between each snapshot may be significant and data in between frames may be lost, not captured or distorted.

One type of visual artifact that may be caused by the effects of the head or the camera movements is judder effect. The visual artifact may be generated by a method of image acquisition in which each frame may be recorded from a snapshot at a single point in time. Judder effect is perceived when eyes attempt to track a moving object across a display screen which may be captured by a camera panning across the object. Video and film create the illusion of movement by rapidly displaying an object at different discrete locations, some number of times per second. However, your eyes track moving objects by moving smoothly. As a result, the object's position tends to gradually fall behind where your eyes may be looking, and then suddenly may catch up when the new frame appears. In film, frames are captured at 24 times per second, which may be slow enough to create a noticeable feeling of vibration or "judder". The judder effect may be the sudden catch up, sometimes referred to as a jerk as a new frame appears. This method of video capture may produce distortions of fast-moving objects.

Accordingly, it is desirable to address the limitations in the art. For example, there exists a need to provide for systems and methods that may reduce the judder effect issue for a camera that may be panning an object faster than the frame render speed.

BRIEF DESCRIPTION OF THE DRAWINGS

By way of example, reference will now be made to the accompanying drawings, which are not to scale.

DETAILED DESCRIPTION

Those of ordinary skill in the art will realize that the following description of the present invention is illustrative only and not in any way limiting. Other embodiments of the invention will readily suggest themselves to such skilled persons, having the benefit of this disclosure. Reference will now be made in detail to specific implementations of the present invention as illustrated in the accompanying drawings. The same reference numbers will be used throughout the drawings and the following description to refer to the same or like parts.

Certain embodiments may modify the duty cycle of one or more pixels to improve discrepancies of visual artifacts, such as judder effect, in the visual field of a camera in the process of capturing an image.

Methods and systems are disclosed for avoiding discrepancies of visual artifacts in the visual field or for compensation for discrepancies in an image that may be captured with a moving camera or a moving head. The visual artifacts in the visual field may be reduced or eliminated by monitoring head and camera movements for a Heads Up Display (HUD) application, and feeding back the movement data to a compensation circuit so that it may eliminate or reduce the visual artifacts such as, judder effect, as the head and/or the camera move relative to the objects that the camera may be capturing. The compensation circuit may use the movement data to modify the duty cycle of the display dynamically to eliminate or reduce these visual artifacts. The display's duty cycle may be dynamically controlled at different rates for different head and camera movement speeds. For a faster camera or head movements, the duty cycle of the display may need to be shorter to lower the persistence of the imaging system which may reduce the appearance of the judder effect. This may reduce the judder effect but may also decrease the brightness of the display. Other aspects and advantages of various aspects of the present invention can be seen upon review of the figures and of the detailed description that follows.

In certain embodiments, an image capture system is disclosed for compensating for visual artifacts by varying a duty cycle of portions of a display, comprising: a duty cycle calculator for determining at least one duty cycle adjustment for at least one group of one or more pixels of a display based at least in part on movement data; and a pixel driver for varying at least one duty cycle of the at least one group based at least in part on the at least one duty cycle adjustment. The image capture system may further comprise a movement sensor for determining the movement data. The movement sensor may comprise: a camera movement sensor; and a head movement sensor. The movement sensor may determine movement data by measuring motion of a user's eyes. The movement sensor may determine movement data by measuring motion of a camera. The movement data may comprise real time movement data. The movement data may comprise predicted movement data. The movement data may comprise real-time data and predicted movement data. The duty cycle may be varied between 0% and 100%. The duty cycle calculator may calculate a plurality of duty cycle adjustments for a plurality of groups of pixels. The duty cycle calculator may determine a size of the at least one group of pixels. The duty cycle calculator may determine a shape of the at least one group of pixels. The duty cycle calculator may determine a location of the at least one group of pixels.

In certain embodiments, a method is disclosed of compensating for visual artifacts by varying a duty cycle of portions of a display, comprising: determining at least one duty cycle adjustment for at least one group of one or more pixels of the display based at least in part on movement data; and varying at least one duty cycle of the at least one group based at least in part on the at least one duty cycle adjustment. The movement data may comprise movement data for a user's eyes. The movement data may comprise movement data for a camera. The movement data may comprise real time movement data. The movement data may comprise predicted movement data. The movement data may comprise real-time data and predicted movement data. The duty cycle may be varied between 0% and 100%. The duty cycle calculator may calculate a plurality of duty cycle adjustments for a plurality of groups of one or more pixels. The duty cycle calculator may determine a size of each of the at least one group. The duty cycle calculator may determine a location of the at least one group.

Figure 1:
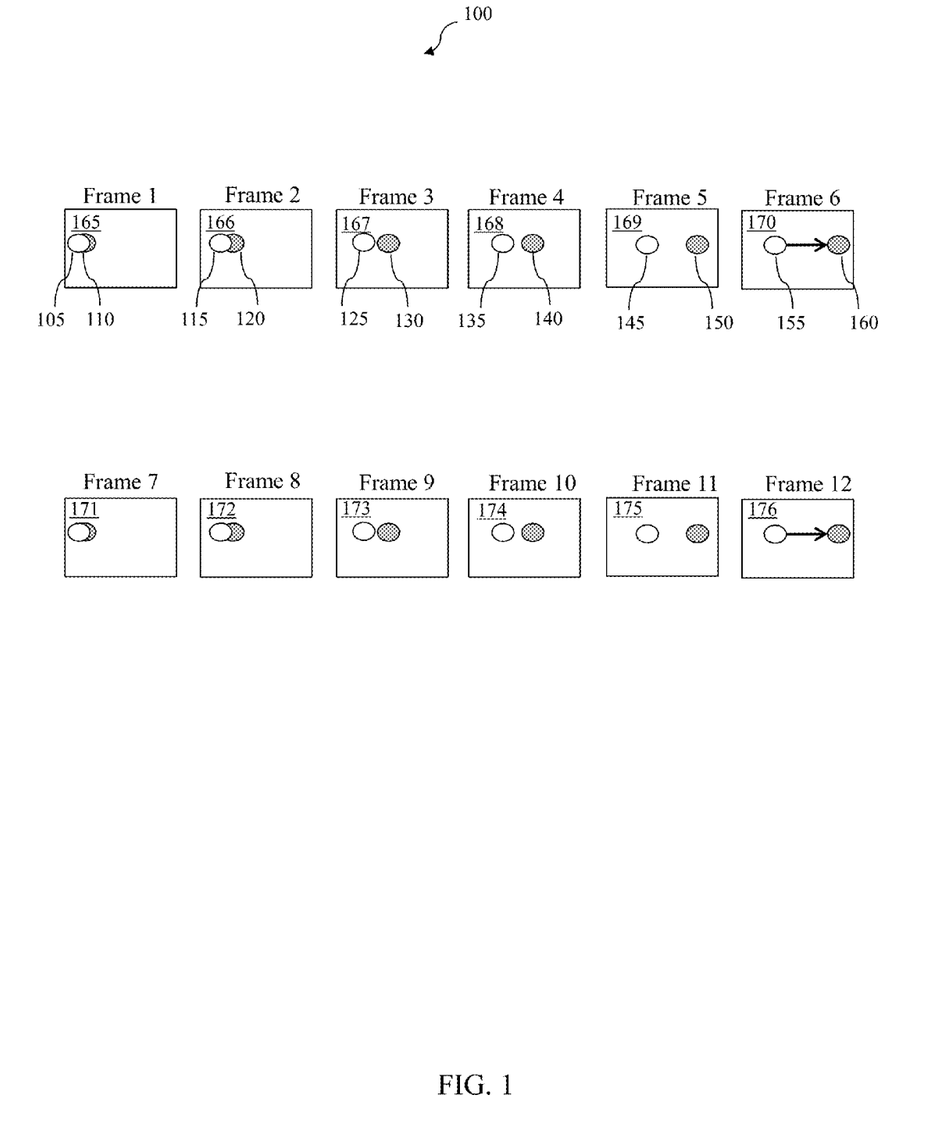
FIG. 1 depicts a display displaying an image moving across a display illustrating the judder effect.

FIG. 1 shows the judder effect 100. FIG. 1 shows an object 105, 115, 125, 135, 145, and 155 moving across the display in sequential frames 165, 166, 167, 168, 169, and 170. The eyes viewpoint 110, 120, 130, 140, 150, and 160 may track a moving object by moving smoothly across the display. The object's position 105, 115, 125, 135, 145, 155 tends to gradually fall behind where a user's eyes may be looking 110, 120, 130, 140, 150, and then suddenly the object 155 may catch up to the eyes' viewpoint 160 when the new frame appears as in frame 6 170. The object 155 suddenly moves to where the eye may be viewing 160, since the object may be captured at frame boundaries which may not be fast enough to keep up with the camera or the head panning the object. The next set of frames 171, 172, 173, 174, 175, and 176 may show that the cycle may repeat itself as the camera or head may still be moving.

Figure 2:
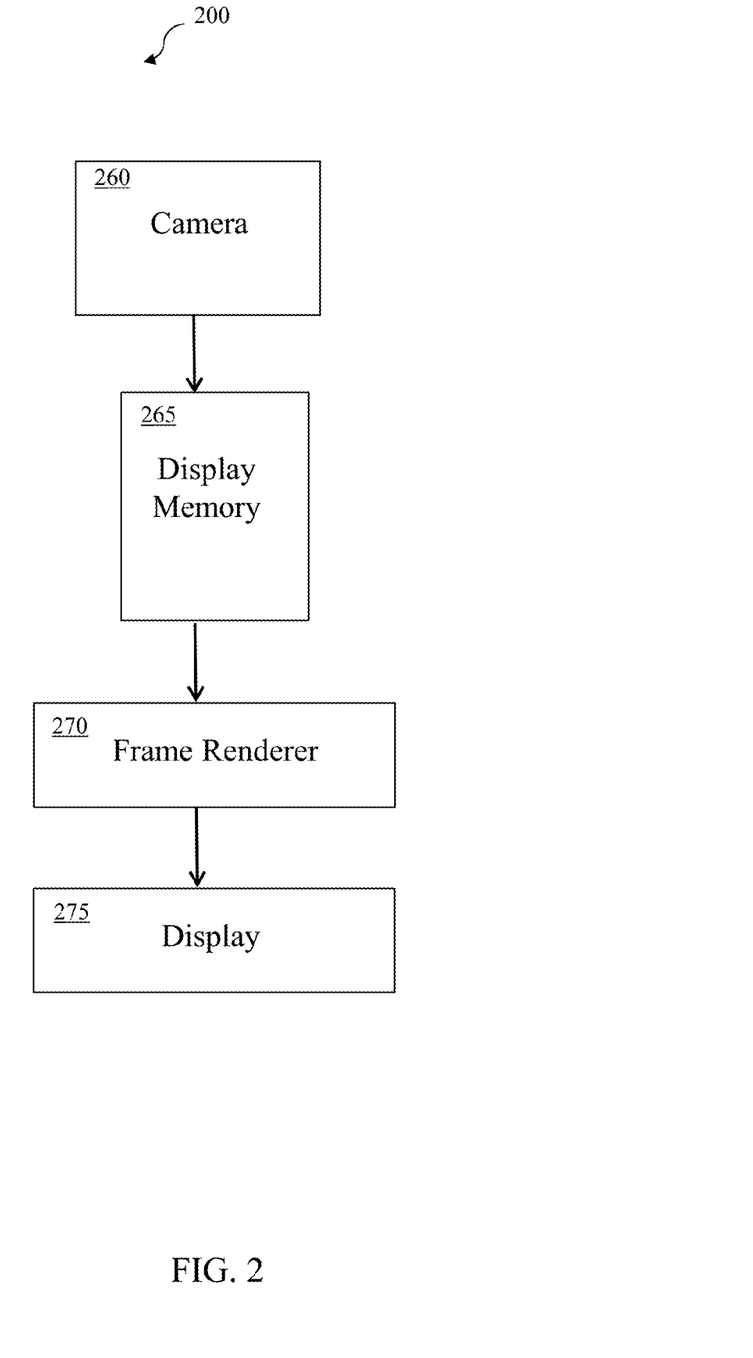
FIG. 2 depicts a block diagram of a camera image capture system.

FIG. 2 depicts a block diagram of a system 200 for capturing and displaying images. Camera 260 may capture images and may deliver images to Display Memory 265. The images may be stored in the Display Memory 265 for approximately one frame period while waiting to be written to the Display 275. At the boundary of every frame, Frame Renderer 270 may extract the images stored in the Display Memory 265 and may render the images to the Display 275. One possible solution to avoid or eliminate discrepancies of visual artifacts in the visual field, including but not limited to judder effect, may be to raise the frame rate to a large number. For example and without limitation, a frame may be rendered to the Display 275 at a rate of 1000 frames per second or greater so that frames that may be captured by a Camera 260 may be rendered to a display much faster. This approach may allow for the images that may be captured to more accurately represent the images without the judder effect because the camera system 200 may be able to render the frames faster than the camera 260 may be able to pan across the objects. This may be very computationally intensive and very power hungry for portable applications such as without limitation a Heads Up Display (HUD) application. If stereo is required, such as multiple displays, such as for both eyes, the approach may be even more computationally intensive and even more power hungry for an application that may need to operate from a battery.

Figure 3:
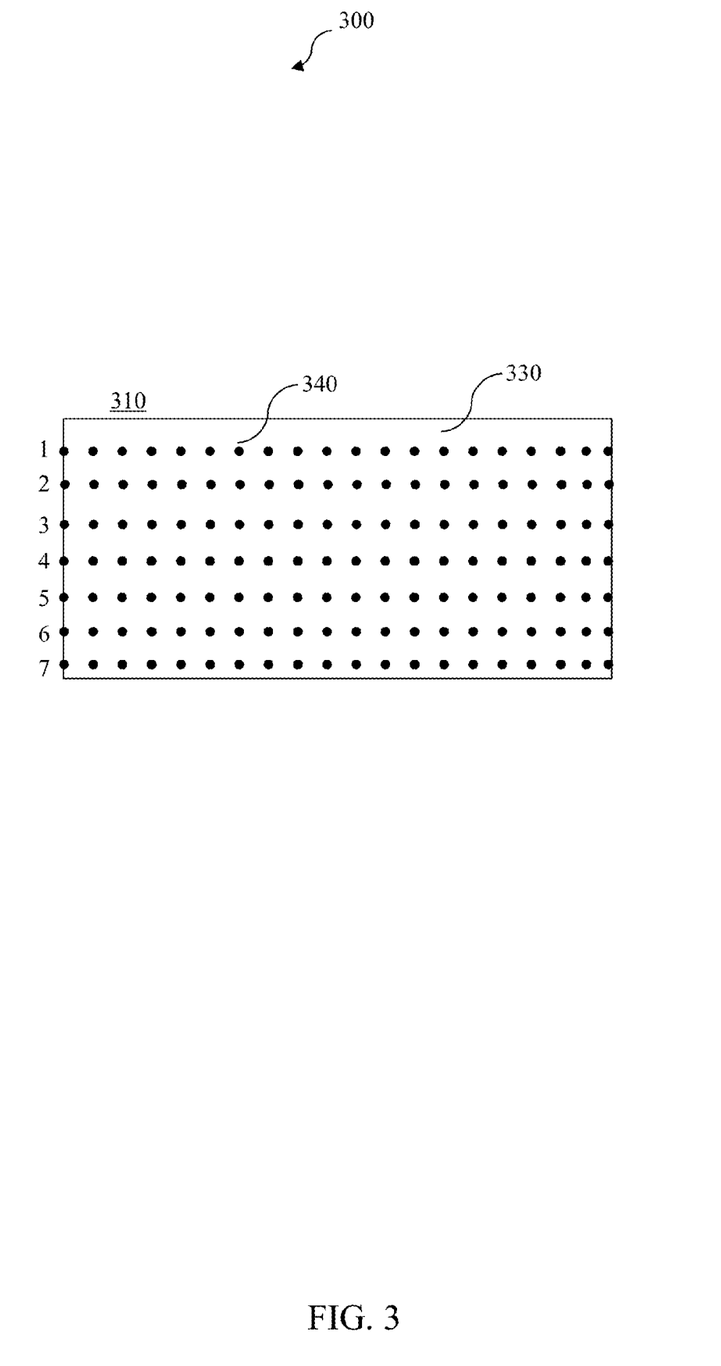
FIG. 3 depicts a view of a display data set with rows of pixels.

In certain embodiments, FIG. 3 depicts a display data set 300 comprising a set of pixels 330 on display 310. Each pixel's duty cycle may be controlled individually. For example a pixel 340 may have its duty cycle controlled from 0% to 100% depending on what the duty cycle control circuitry specifies to the pixel portion driver. To avoid the judder effect, in some instances the duty cycle may need to be dynamically adjusted based on current or predicted head and camera movements. To reduce the judder effect due to camera or head motion, shorter duty cycles may be applied to lower the persistence of the imaging system which may reduce the judder effect. The lowering of the duty cycle may improve the edges of the objects that may be exhibiting the judder effect.

Figure 4:
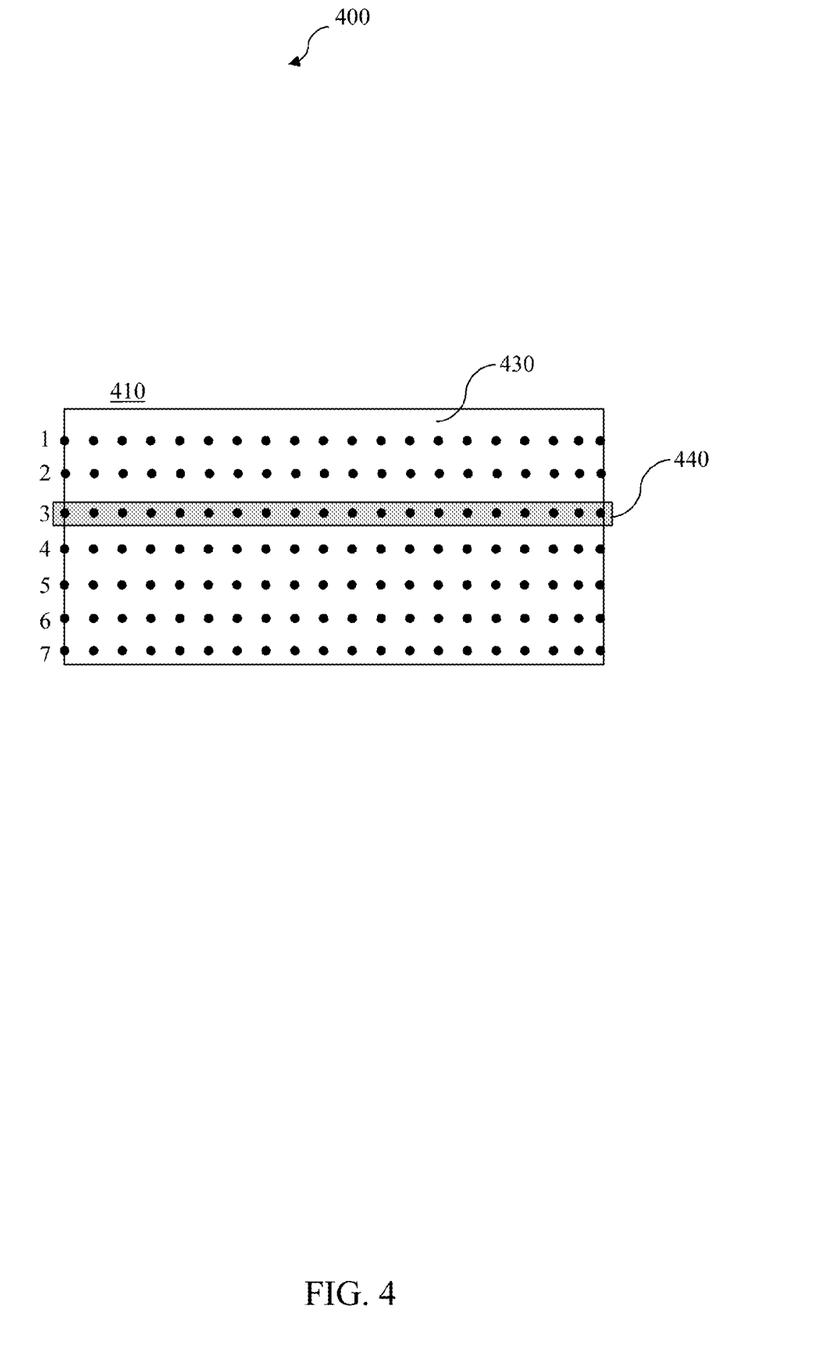
FIG. 4 depicts a view of a line of duty cycle controlled pixels within a display data set in accordance with certain embodiments.

Certain embodiments may modify the duty cycle of a line of pixels to mitigate visual artifacts, such as judder effect, in the visual field of a camera that may be capturing an image. In certain embodiments, FIG. 4 depicts a display data set 400 that comprises a display 410 with multiple rows of pixels 430, including a row of pixels 440. Each row's duty cycle may be controlled individually. For example a row of pixels 440 may have its duty cycle controlled from 0% to 100% depending on what the duty cycle control circuitry specifies to a pixel driver. To reduce the judder effect, in some instance the duty cycle may need to be dynamically adjusted based on current or predicted head and camera movements. To mitigate the judder effect due to camera or head movement, shorter duty cycles may be applied to lower the persistence of the imaging system, which may reduce the judder effect. The lowering of the duty cycle may improve the edges of the objects that may be exhibiting the judder effect.

Figure 5:
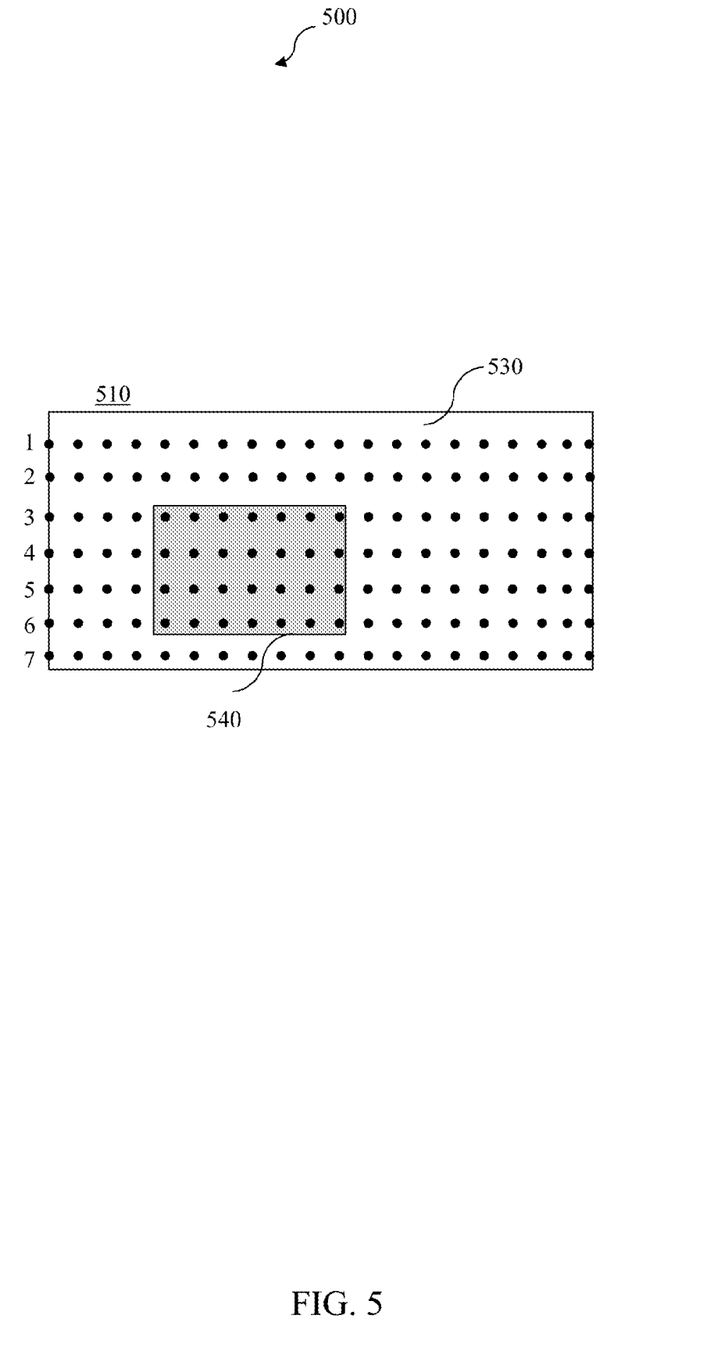
FIG. 5 depicts a view of a portion of duty cycle controlled pixels within a display data set in accordance with certain embodiments.

Certain embodiments may modify the duty cycle of a portion of pixels to improve discrepancies of visual artifacts, such as judder effect, in the visual field of a camera that may be capturing an image. In certain embodiments, FIG. 5 depicts a display data set 500 that comprises a display 510 with a set of m by n pixels 530 including one or more groups of pixels, such as group 540 of pixels a by b, where $1 \leq a \leq m$ and $1 \leq b \leq n$. In some embodiments, duty cycle of each group of pixels may be controlled individually. For example, group 540 may have its duty cycle controlled from 0% to 100% depending on what the duty cycle control circuitry specifies to the pixel driver. To reduce the judder effect, in some instance the duty cycle may need to be dynamically adjusted based on current or predicted head and camera movements. To mitigate the judder effect due to camera or head movements, shorter duty cycles may be applied to lower the persistence of the imaging system which may reduce the judder effect. The lowering of the duty cycle may improve the edges of the objects that may be exhibiting the judder effect.

Figure 6:
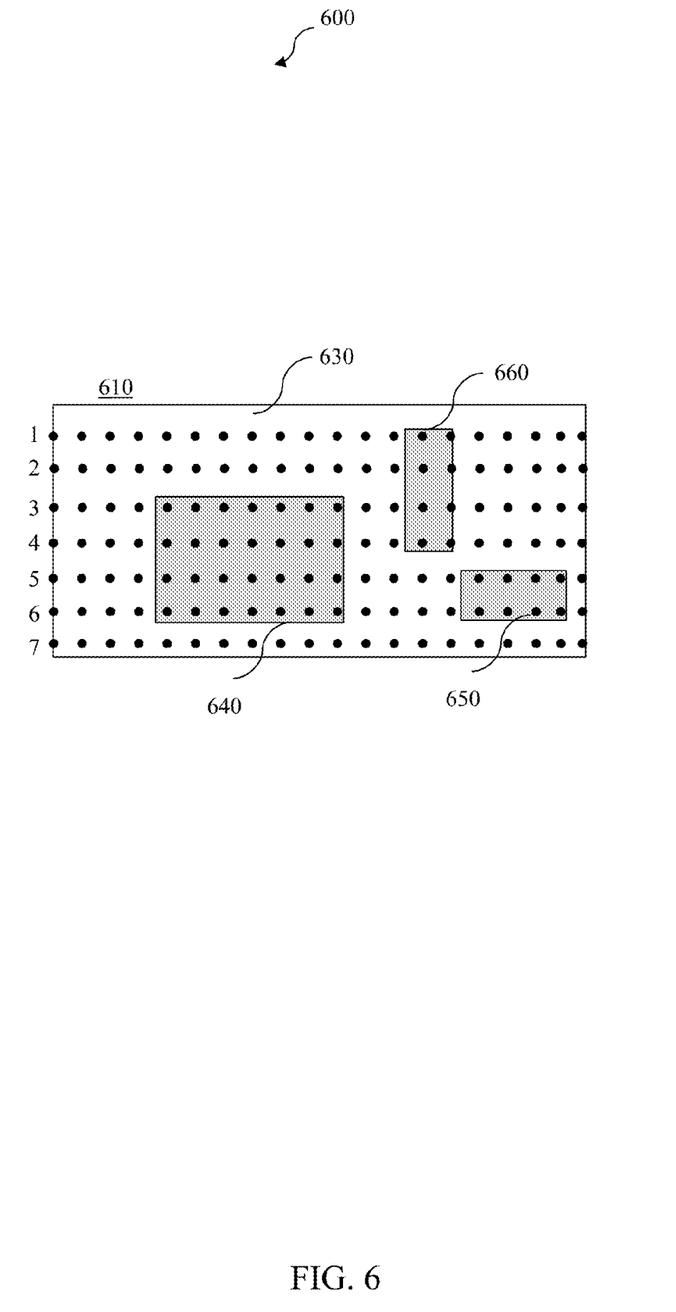
FIG. 6 depicts a view of multiple portions of duty cycle controlled pixels within a display data set in accordance with certain embodiments.

Certain embodiments may modify the duty cycle of multiple groups of pixels to improve discrepancies of visual artifacts, such as judder effect, in the visual field of a camera that may be capturing an image. In certain embodiments, FIG. 6 depicts a display data set 600 that comprises a display 610 with a set of m by n pixels 630 that includes a first group 640 of pixels a by b, where 1≤a≤m and 1≤b≤n, a second group 650 of pixels c by d, where 1≤c≤m and 1≤d≤n, and a third group 660 of pixels p by q, where 1≤p≤m and 1≤q≤n. Each group 640, 650, and 660 may contain a different set of pixels and have a different shape. The shape of a group of pixels may be any shape such as a square, a rectangle, an approximate circle, or any other non-linear shape as can be approximated. In some embodiments, duty cycle of each group of pixels may be controlled independently of other groups of pixels. For example groups 640, 650, and 660 may each have their duty cycles controlled from 0% to 100% depending on what the duty cycle control circuitry specifies to a pixel driver. To reduce the judder effect, the duty cycle may be dynamically adjusted based on current or predicted head and camera movements. To mitigate the judder effect due to camera or head motion, shorter duty cycles may be applied to lower the persistence of the imaging system which may reduce the judder effect. The lowering of the duty cycle may improve the edges of the objects that may be exhibiting the judder effect.

Figure 7:
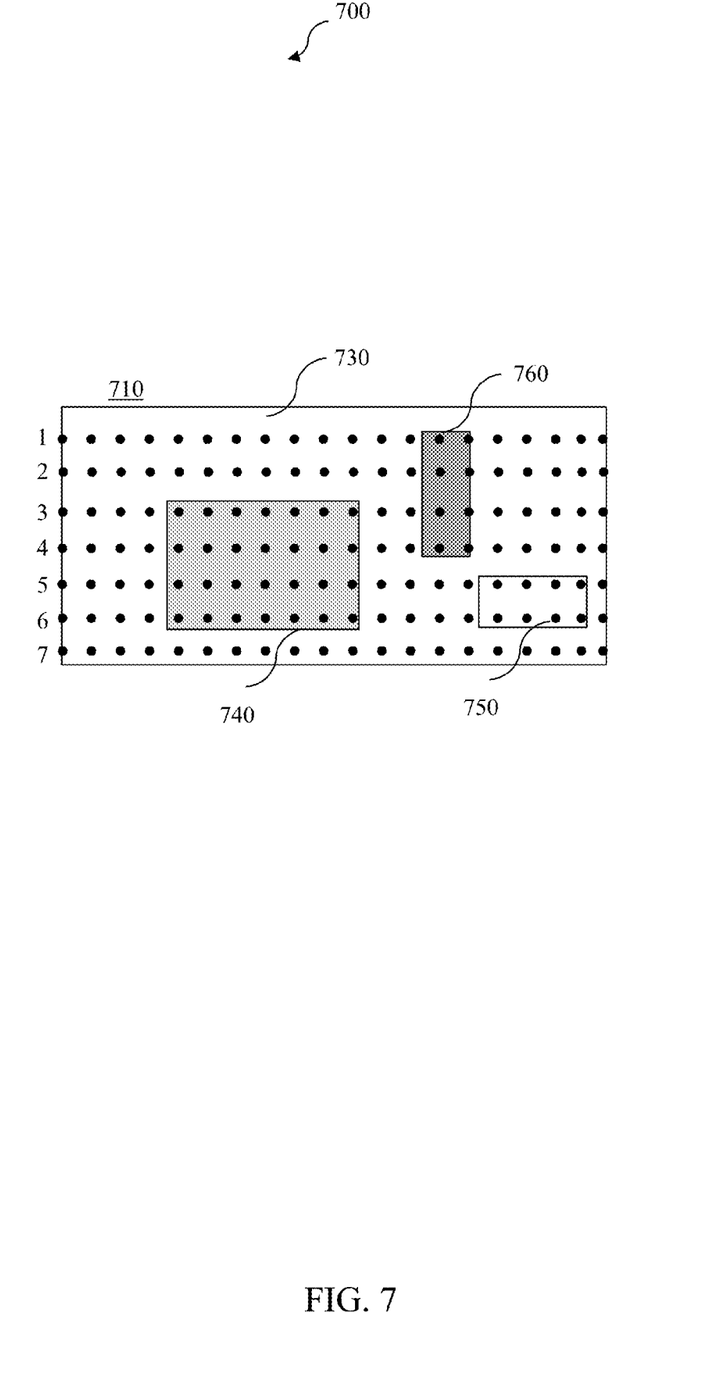
FIG. 7 depicts a view of multiple portions of controlled pixels within a display data set with different duty cycles in accordance with certain embodiments.

In certain embodiments, FIG. 7 depicts a display data set 700 that comprises a display 710 with a set of m by n pixels 730 that includes a first group 740 of pixels a by b, where 1≤a≤m and 1≤b≤n, a second group 750 of pixels c by d, where 1≤c≤m and 1≤d≤n, and a third group 760 of pixels p by q, where 1≤p≤m and 1≤q≤n. Each group 740, 750, and 760 may contain a different set of pixels and have a different shape. Each group 740, 750, and 760 may have a different duty cycle depending on what the duty cycle control circuit specifies to the pixel driver for each portion. FIG. 7 illustrates three groups 740, 750, and 760 where each group has a different duty cycle shown as illustrated by different grey scaling of each group.

Multiple groups and individual pixels may also be intermixed to mitigate localized discrepancies of visual artifacts, such as judder effect, in the visual field of a camera that may be capturing an image. A display data set may contain multiple groups and multiple pixel groupings that may have their respective duty cycles varied independently of one another to mitigate localized judder effects. Therefore, it is understood that the invention is not to be limited to the specific embodiments disclosed, and that modifications and embodiments are intended to be included as readily appreciated by those skilled in the art.

Figure 8:
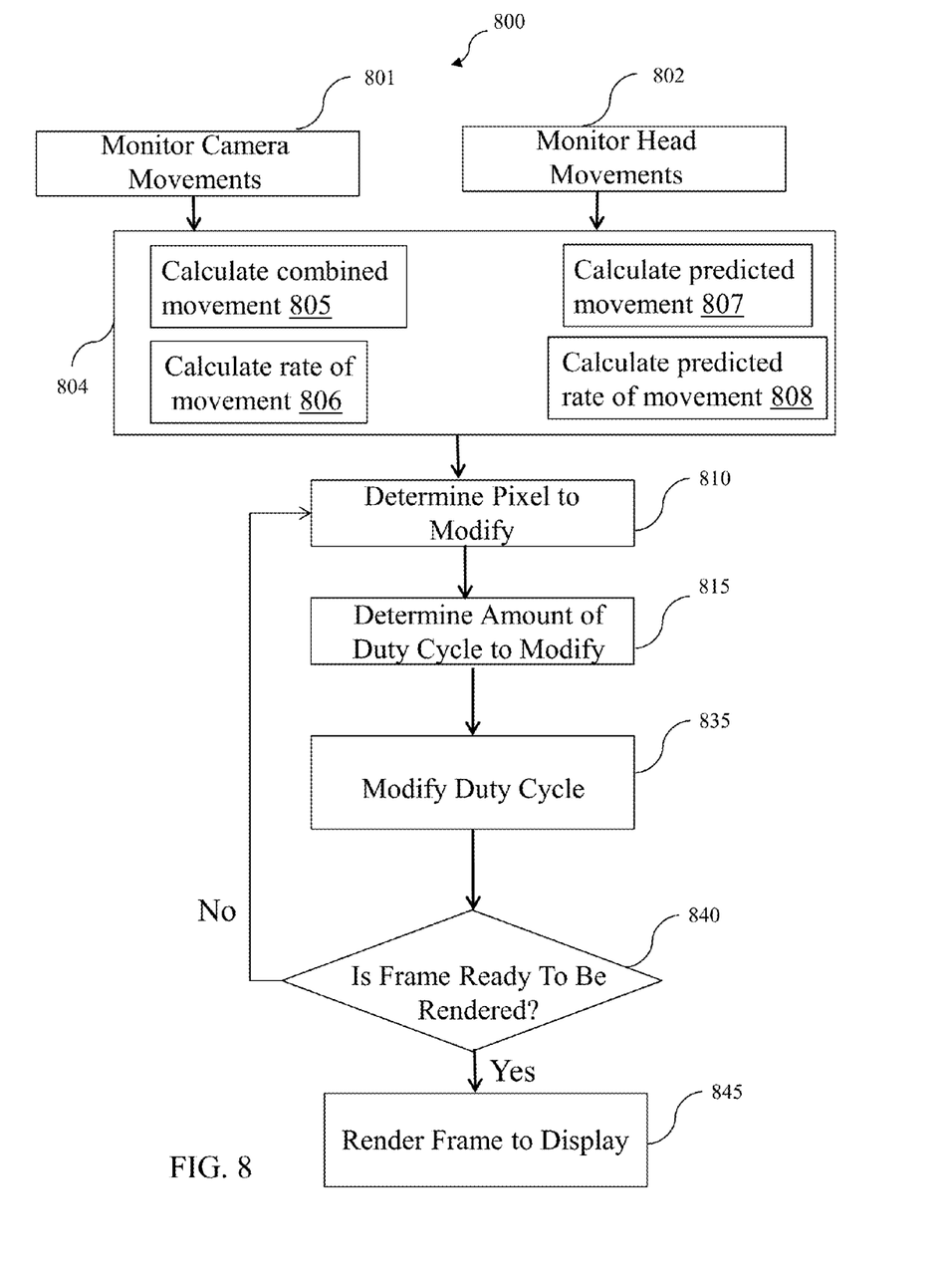
FIG. 8 depicts a flow chart of a method of an image capture system varying the duty cycle of pixels of a display data set in accordance with certain embodiments.

In certain embodiments, FIG. 8 illustrates a flow chart of a method 800 for modifying the duty cycle of pixels to mitigate visual artifacts, such as judder effect, in the visual field of a camera that may be capturing an image. The modification of the duty cycle of a pixel may occur intra-frame, while a frame may be waiting to be rendered to the display. The method may begin by measuring and/or monitoring how much the camera may be moving (801). Movements of the head may also be measured and/or monitored (802). In some embodiments, camera movements and head movements are monitored by devices that may comprise one or more accelerometers that measure how much, in what direction and how quickly the camera and the head respectively move.

Measurements of movements of the head and the camera may be used to calculate a measure of combined real-time movement (805) of the head and the camera. In some embodiments, the measurements further may be used to determine a rate of movement (806). In some embodiments, the measurements of movements of the head and the camera may be input to a prediction algorithm that outputs predicted movements (of head and/or camera) (807) and/or a predicted rate of movement (808). In certain embodiments, the predicted movements may be used as an input to block 805 and may be used in calculating the combined movement at 805. In some embodiments, one or more of the combined real-time movement (805), rate of movement (806), predicted movement (807) and the predicted rate of movement (808) are used to modify the duty cycle of one or more pixels and/or one or more groups of pixels. If the camera or the head moves faster than the frame rate of the camera, then visual artifacts may appear on the display. In certain embodiments, these visual artifacts may be corrected by varying the duty cycle of one or more pixels and/or one or more groups of pixels to compensate for these movements.

In certain embodiments, the total magnitude of movement and/or the rate of the movements may be then used to calculate the modification of duty cycle of one or more pixels and/or one or more groups of pixels. In certain embodiments, method 800 determines which pixel or pixels to modify (810). A pixel may be selected to have its duty cycle modified depending on the combined movement calculation calculated at 805. Determining the amount of duty cycle to modify 815 for a particular pixel may be calculated using the combined movement data. The duty cycle may be modified 815 between the range of about 0% to about 100%. In some embodiments, the faster the camera or head moves, the shorter the duty cycle that may be applied to the display so that the image has low persistence. This may reduce the judder effect, but may also may decrease the brightness of the display.

The pixel's duty cycle may then be modified (835) on the display. If the frame is not ready to be rendered to the display (840), the modification of the duty cycle of a pixel may continue. The modification of the pixel may also be continuous in between rendering frames to the display 845. The cycle of calculating combined movements 805 of the camera and the head may be continuous and determining which pixel to modify as well as the amount of duty cycle to modify may continuously be adapted and changed until a frame is ready to be rendered. The duty cycle may be modified to offset the camera and head movements to mitigate visual artifacts, such as judder effect, in the visual field. After the frame is rendered, the process may start over with the next frame of data to be displayed.

Figure 9:
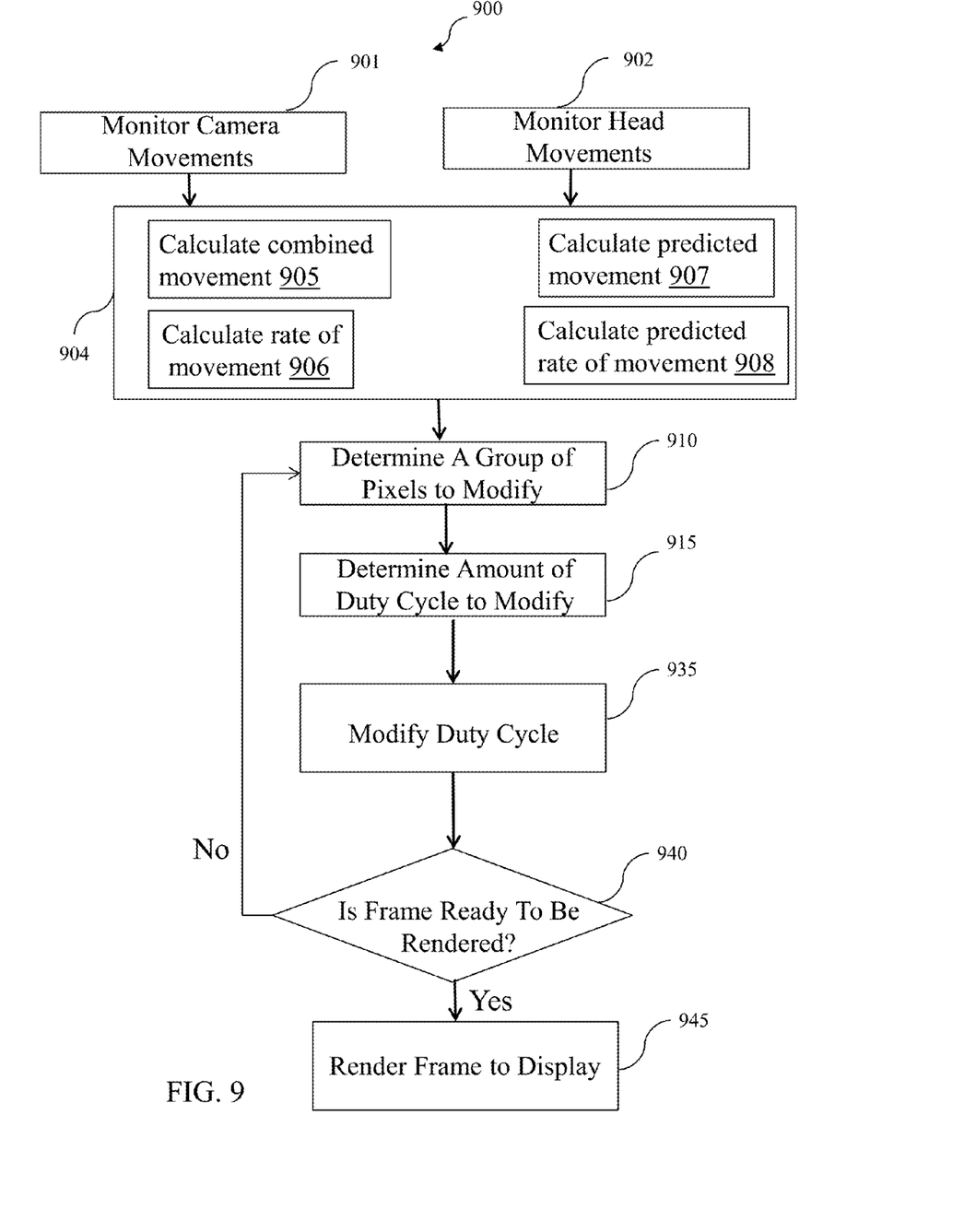
FIG. 9 depicts a flow chart of a method of an image capture system varying the duty cycle of portions of a display data set in accordance with certain embodiments.

In certain embodiments, FIG. 9 illustrates a flow chart of a method 900 for modifying the duty cycle of a group of pixels, such as row 440 or group 540 in order to mitigate discrepancies of visual artifacts, such as judder effect, in the visual field as a camera may be capturing an image. The modification of duty cycle to the group of pixels may occur intra-frame while a frame may be waiting to be rendered to the display.

Method 900 is similar to method 800, except that duty cycle for a group of pixels is modified (910) within the display pixels. When the group is a 1 by 1 matrix, then it becomes the case discussed with reference to FIG. 8. The amount of the duty cycle modification 915 to be performed to the group of pixels may be between the range of 0% to 100%. The duty cycle of the group of pixels may then be modified (935). If the frame is not ready to be rendered to the display (940), the modification of the duty cycle of the group of pixels may continue. The modification of the group of pixels may also be continuous in between rendering frames. The cycle of calculating combined movements of the camera and the head may be continuous and determining which portion of pixels to modify as well as the amount of duty cycle to modify may continuously be updated and changed while a frame is waiting to be rendered. The duty cycle may be modified to offset the camera and head movements to mitigate visual artifacts, such as judder effect, in the visual field. After the frame is rendered, the process may start over with the next display frame of data as the method is described here.

Figure 10:
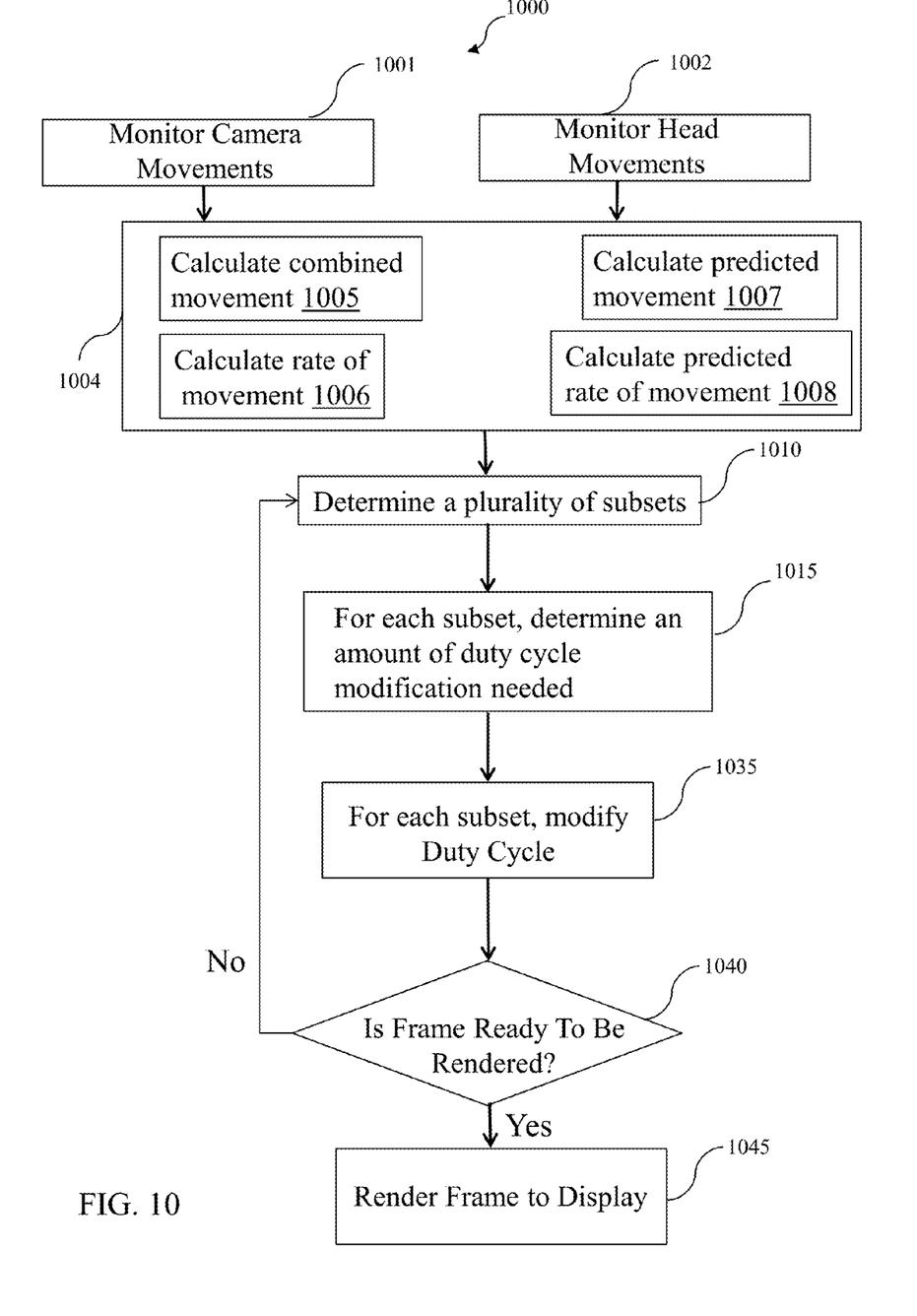
FIG. 10 depicts a flow chart of the method of an image capture system varying the duty cycle of multiple portions of a display data set in accordance with certain embodiments.

FIG. 10 illustrates a flow chart of a method 1000 for modifying the duty cycle of multiple groups of pixels, such as groups 640, 650 and 660. As discussed above with reference to FIG. 6, a set of m by n pixels 630 may include a first group 640 of pixels a by b, where $1 \le a \le m$ and $1 \le b \le n$, a second group 650 of pixels c by d, where $1 \le c \le m$ and $1 \le d \le n$, and a third group 660 of pixels p by q, where $1 \le p \le m$ and $1 \le q \le n$. Method 900 may function, to mitigate visual artifacts, such as judder effect, in the visual field. While the exemplary groups illustrated in FIG. 6 are rectangular in shape, the groups may assume various shapes, such as square (a special case of a rectangle), an approximate circle (a plurality of rectangles), etc.

In certain embodiments, the modification of duty cycle of multiple groups of pixels may occur intra-frame while a frame may be waiting to be rendered to the display. Method 1000 is similar to method 800, except that duty cycle for a plurality of groups of pixels is modified (1010) within the display. Each of the plurality of groups of pixels may be controlled independently of one another. In some embodiments, the modification of duty cycle of the plurality of groups of pixels happens in parallel. Alternately, depending on processing power, etc. and in other embodiments, the modification may be performed in serial. The duty cycle for different sections of a display may be controlled by controlling the respective duty cycles of different groups of pixels. For each group, the amount of duty cycle to be modified is determined (1015). The amount of the duty cycle may be modified 1015 between the range of about 0% to about 100%. Each of the multiple groups of pixels may have a different duty cycle, for example and without limitation, one group of pixels (e.g. group 640) may have a duty cycle of 25% while another group (e.g., group 650) may have a duty cycle of 75%. Duty cycle modification of the groups of pixels may continue until completed for each group of pixels. If the frame is not ready to be rendered to the display (1040), the modification of the duty cycle for the plurality of groups of pixels may continue. The modification of multiple groups of pixels may also be continuous in between rendering frames (1045). The cycle of calculating combined movements of the camera and the head (at blocks 1004-1008) may be continuous and the determination of which groups of pixels to modify as well as the amount of duty cycle to modify on each group of pixels may be continuously updated and changed while a frame may be waiting to be rendered. The duty cycles may be modified to offset the camera and head movements to mitigate visual artifacts, such as judder effect, in a visual field. After the frame is rendered, the process may repeat with the next display frame of data as described herein.

Figure 11:
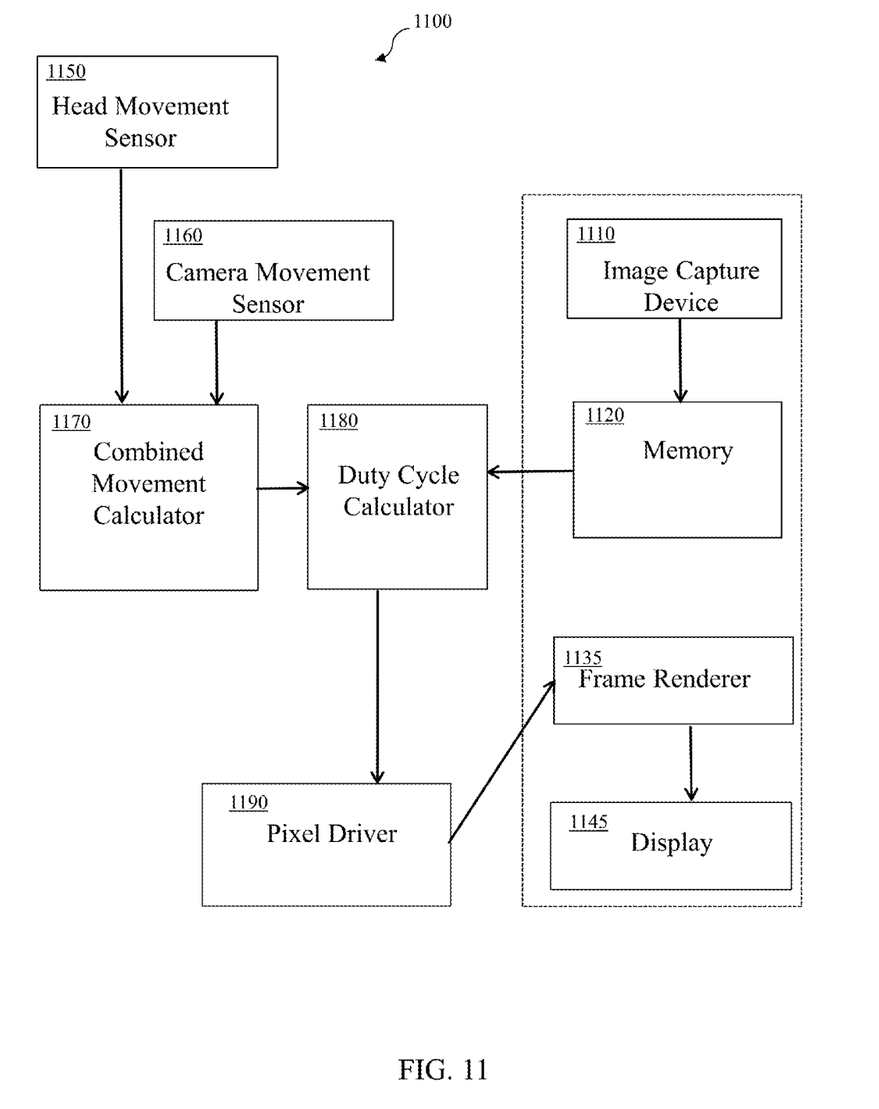
FIG. 11 depicts a block diagram of operation of an image capture system that varies the duty cycle of subsets of a display data set in accordance with certain embodiments.

In certain embodiments, the block diagram of FIG. 11 may depict a system 1100 of varying the duty cycle of groups of pixels on a display, to mitigate visual artifacts, such as judder effect. Image Capture device 1110 may capture image data, which may be input to memory 1120 (e.g., a cache, or a buffer), e.g., in real-time. A Head Movement Sensor 1150 may measure the head movements of a user of a heads-up display (HUD). Head Movement Sensor 1150 may include without limitation one or more accelerometers that may measures how much, in what direction and how quickly the head moves. Camera Movement Sensor 1160 may measure the camera movements of a camera mounted to a heads-up display (HUD). Camera Movement Sensor 1160 may include without limitation one or more accelerometers that measures how much, in what direction and how quickly the camera moves. Head Movement Sensor 1150 and Camera Movement Sensor 1160 provide their respective measurements to the Combined Movement Calculator 1170. Combined Movement Calculator 1170 may combine both of these measurements to obtain a total vector of movement of the head and the camera combined. The total vector may be calculated from the head and camera measurements, predicted movements, or a combination of both. The total vector may be composed of the components of the direction, magnitude, and acceleration of the movement of both the head and the camera. Output from Combined Movement Calculator is input to Duty Cycle Calculator 1180. Duty Cycle Calculator 1180 may use the total vector and image data from Memory 1120 to select the number of groups of pixels that need their duty cycle varied, select the size of each group, select the amount of duty cycle to be modified, and select the location of each group. Note that the single pixel method described with reference to FIG. 8 refers to the particular case when the number of groups of pixels that need their duty cycle varied is one, and the size of that group is 1 pixel. Note that the single group method described with reference to FIG. 9 refers to the particular case when the number of groups of pixels that need their duty cycle varied is one, and the size of that group is a matrix greater than 1 by 1.

In certain embodiments, Duty Cycle Calculator 1180 includes a compensation circuit that calculates the amount of duty cycle adjustment for each of the groups of pixels to compensate for visual artifacts in the visual field. Duty Cycle Calculator 1180 may be connected to Pixel Driver 1190, which varies the duty cycle of the groups of pixels on the current frame on the display. Pixel Driver 1190 may continue to vary the duty cycle of the groups of pixels until frame renderer 1135 renders frame data from Memory 1120 to Display 1145. The next frame may be captured and processed in the same manner as described above.

Further, certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks.

Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

For example, any number of computer programming languages, such as C, C++, C# (CSharp), Perl, Ada, Python, Pascal, SmallTalk, FORTRAN, assembly language, and the like, may be used to implement aspects of the present invention. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of functions.

The term "machine-readable medium" should be understood to include any structure that participates in providing data which may be read by an element of a computer system. Such a medium may take many forms, including but not limited to, non-volatile media, volatile media, and transmission media. Non-volatile media include, for example, optical or magnetic disks and other persistent memory. Volatile media include dynamic random access memory (DRAM) and/or static random access memory (SRAM). Transmission media include cables, wires, and fibers, including the wires that comprise a system bus coupled to processor. Common forms of machine-readable media include, for example, a floppy disk, a flexible disk, a hard disk, a magnetic tape, any other magnetic medium, a CD-ROM, a DVD, any other optical medium.

Figure 12A:
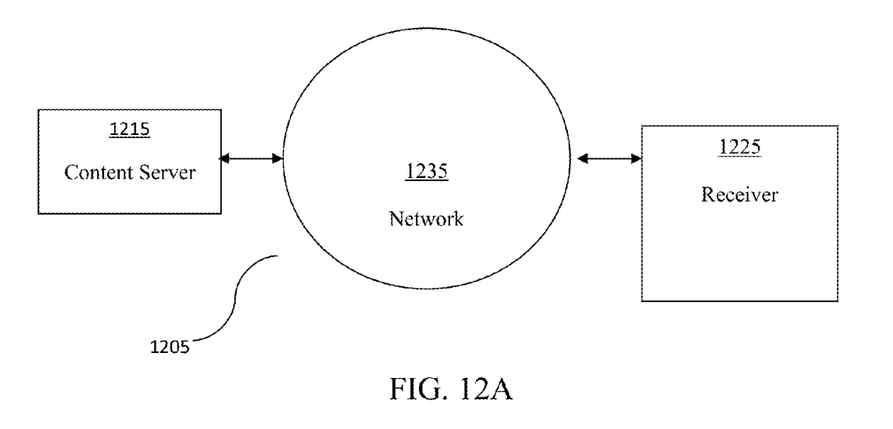
FIG. 12A illustrates an exemplary networked environment and its relevant components according to certain embodiments.

FIG. 12A depicts an exemplary networked environment 1205 in which systems and methods, consistent with exemplary embodiments, may be implemented. As illustrated, networked environment 1205 may include a content server 1215, a receiver 1225, and a network 1235. The exemplary simplified number of content servers 1215, receivers 1225, and networks 1235 illustrated in FIG. 12A can be modified as appropriate in a particular implementation. In practice, there may be additional content servers 1215, receivers 1225, and/or networks 1235.

In certain embodiments, a receiver 1225 may include any suitable form of multimedia playback device, including, without limitation, a cable or satellite television set-top box, a DVD player, a digital video recorder (DVR), or a digital audio/video stream receiver, decoder, and player. A receiver 1225 may connect to network 1235 via wired and/or wireless connections, and thereby communicate or become coupled with content server 1215, either directly or indirectly. Alternatively, receiver 1225 may be associated with content server 1215 through any suitable tangible computer-readable media or data storage device (such as a disk drive, CD-ROM, DVD, or the like), data stream, file, or communication channel.

Network 1235 may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an Internet Protocol Multimedia Subsystem (IMS) network, a private network, the Internet, an intranet, and/or another type of suitable network, depending on the requirements of each particular implementation.

One or more components of networked environment 1205 may perform one or more of the tasks described as being performed by one or more other components of networked environment 1205.

Figure 12B:
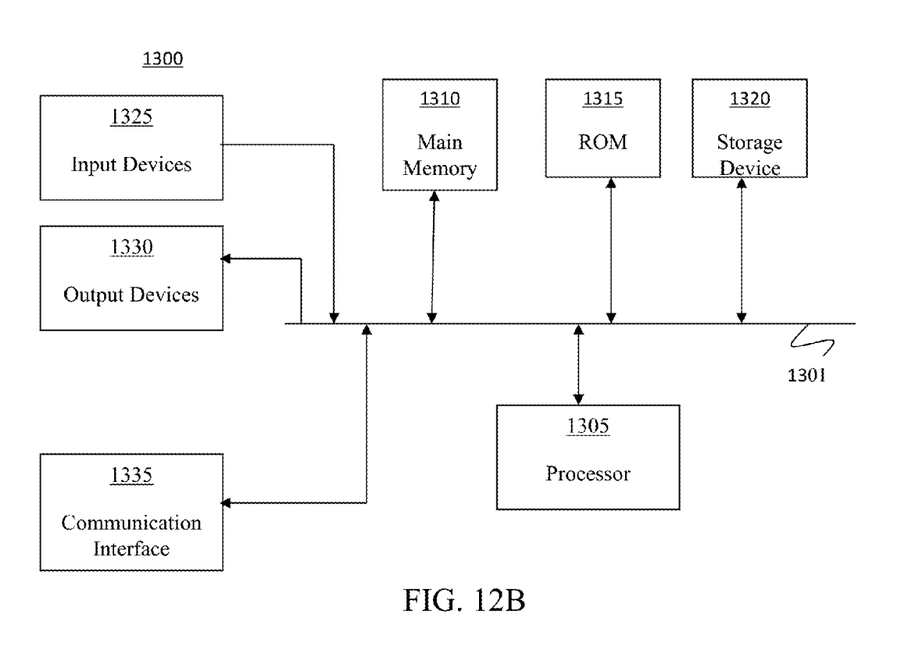
FIG. 12B is an exemplary block diagram of a computing device that may be used to implement certain embodiments.

FIG. 12B is an exemplary diagram of a computing device 1300 that may be used to implement aspects of certain embodiments of the present invention, such as aspects of content server 1215 or of receiver 1225. Computing device 1300 may include a bus 1301, one or more processors 1305, a main memory 1310, a read-only memory (ROM) 1315, a storage device 1320, one or more input devices 1325, one or more output devices 1330, and a communication interface 1335. Bus 1301 may include one or more conductors that permit communication among the components of computing device 1300.

Processor 1305 may include any type of conventional processor, microprocessor, or processing logic that interprets and executes instructions. Main memory 1310 may include a random-access memory (RAM) or another type of dynamic storage device that stores information and instructions for execution by processor 1305. ROM 1315 may include a conventional ROM device or another type of static storage device that stores static information and instructions for use by processor 1305. Storage device 1320 may include a magnetic and/or optical recording medium and its corresponding drive.

Input device(s) 1325 may include one or more conventional mechanisms that permit a user to input information to computing device 1300, such as a keyboard, a mouse, a pen, a stylus, handwriting recognition, voice recognition, biometric mechanisms, and the like. Output device(s) 1330 may include one or more conventional mechanisms that output information to the user, including a display, a projector, an A/V receiver, a printer, a speaker, and the like. Communication interface 1335 may include any transceiver-like mechanism that enables computing device/server 1300 to communicate with other devices and/or systems. For example, communication interface 1335 may include mechanisms for communicating with another device or system via a network, such as network 1235 as shown in FIG. 12A.

In certain embodiments, computing device 1300 may perform operations based on software instructions that may be read into memory 1310 from another computer-readable medium, such as data storage device 1320, or from another device via communication interface 1335. The software instructions contained in memory 1310 cause processor 1305 to perform processes that will be described later. Alternatively, hardwired circuitry may be used in place of or in combination with software instructions to implement processes consistent with the present invention. Thus, various implementations are not limited to any specific combination of hardware circuitry and software.

A web browser comprising a web browser user interface may be used to display information (such as textual and graphical information) on the computing device 1300. The web browser may comprise any type of visual display capable of displaying information received via the network 1235 shown in FIG. 12A, such as Microsoft's Internet Explorer browser, Netscape's Navigator browser, Mozilla's Firefox browser, PalmSource's Web Browser, Google's Chrome browser or any other commercially available or customized browsing or other application software capable of communicating with network 1235. The computing device 1300 may also include a browser assistant. The browser assistant may include a plug-in, an applet, a dynamic link library (DLL), or a similar executable object or process. Further, the browser assistant may be a toolbar, software button, or menu that provides an extension to the web browser. Alternatively, the browser assistant may be a part of the web browser, in which case the browser would implement the functionality of the browser assistant.

The browser and/or the browser assistant may act as an intermediary between the user and the computing device 1300 and/or the network 1235. For example, source data or other information received from devices connected to the network 1235 may be output via the browser. Also, both the browser and the browser assistant are capable of performing operations on the received source information prior to outputting the source information. Further, the browser and/or the browser assistant may receive user input and transmit the inputted data to devices connected to network 1235.

Similarly, certain embodiments of the present invention described herein are discussed in the context of the global data communication network commonly referred to as the Internet. Those skilled in the art will realize that embodiments of the present invention may use any other suitable data communication network, including without limitation direct point-to-point data communication systems, dial-up networks, personal or corporate Intranets, proprietary networks, or combinations of any of these with or without connections to the Internet.

There may be other combinations not presented here. Therefore, it is understood that the invention is not to be limited to the specific embodiments disclosed, and that modifications and embodiments are intended to be included as readily appreciated by those skilled in the art.

While the above description contains many specifics and certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art, as mentioned above. The invention includes any combination or subcombination of the elements from the different species and/or embodiments disclosed herein.

We claim:

1. An image capture system for compensating for visual artifacts by varying a duty cycle of portions of a display, comprising:
    a duty cycle calculator for determining at least one duty cycle adjustment for at least one group of one or more pixels of a display based at least in part on movement data from at least one movement sensor; and
    a pixel driver for varying at least one duty cycle of the at least one group based at least in part on the at least one duty cycle adjustment;
    wherein the at least one group of one or more pixels of the display comprises less than all of the pixels of the display.

2. The image capture system of claim 1, wherein the movement sensor comprises:
    a camera movement sensor; and
    a head movement sensor.

3. The image capture system of claim 1, wherein the movement sensor determines movement data by measuring motion of a user's eyes.

4. The image capture system of claim 1, wherein the movement sensor determines movement data by measuring motion of a camera.

5. The image capture system of claim 1, wherein the movement data comprises real time movement data.

6. The image capture system of claim 1, wherein the movement data comprises predicted movement data.

7. The image capture system of claim 1, wherein the movement data comprises real-time data and predicted movement data.

8. The image capture system of claim 1, wherein the duty cycle is varied between 0% and 100%.

9. The image capture system of claim 1, wherein the duty cycle calculator calculates a plurality of duty cycle adjustments for a plurality of groups of pixels.

10. The image capture system of claim 1, wherein the duty cycle calculator determines a size of the at least one group of pixels.

11. The image capture system of claim 1, wherein the duty cycle calculator determines a shape of the at least one group of pixels.

12. The image capture system of claim 1, wherein the duty cycle calculator determines a location of the at least one group of pixels.

13. A method of compensating for visual artifacts by varying a duty cycle of portions of a display, comprising:
    determining at least one duty cycle adjustment for at least one group of one or more pixels of the display based at least in part on movement data from at least one movement sensor; and
    varying at least one duty cycle of the at least one group based at least in part on the at least one duty cycle adjustment;
    wherein the at least one group of one or more pixels of the display comprises less than all of the pixels of the display.

14. The method of claim 13, wherein the movement data comprises movement data for a user's eyes.

15. The method of claim 13, wherein the movement data comprises movement data for a camera.

16. The method of claim 13, wherein the movement data comprises real time movement data.

17. The method of claim 13, wherein the movement data comprises predicted movement data.

18. The method of claim 13, wherein the movement data comprises real-time data and predicted movement data.

19. The method of claim 13, wherein the duty cycle is varied between 0% and 100%.

20. The method of claim 13, wherein the duty cycle calculator calculates a plurality of duty cycle adjustments for a plurality of groups of one or more pixels.

21. The method of claim 13, wherein the duty cycle calculator determines a size of each of the at least one group.

22. The method of claim 13, wherein the duty cycle calculator determines a location of the at least one group.

* * * * *